June 17, 1924.
H. W. CLEMONS
ROAD GRADER
Filed April 23, 1923    2 Sheets-Sheet 2
1,497,891
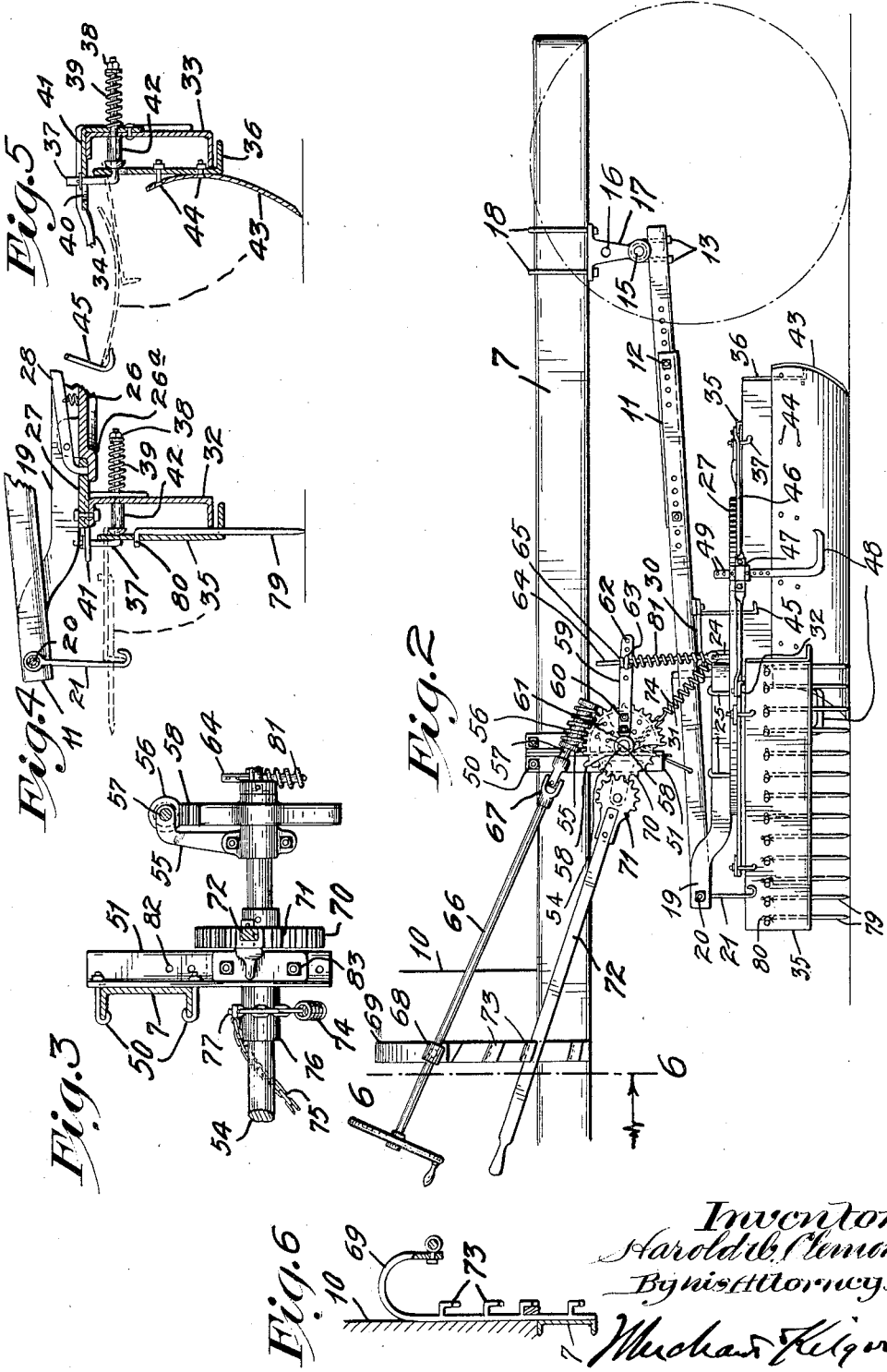
Inventor
Harold W. Clemons
By his Attorneys
Michard Kilgore Patented June 17, 1924.

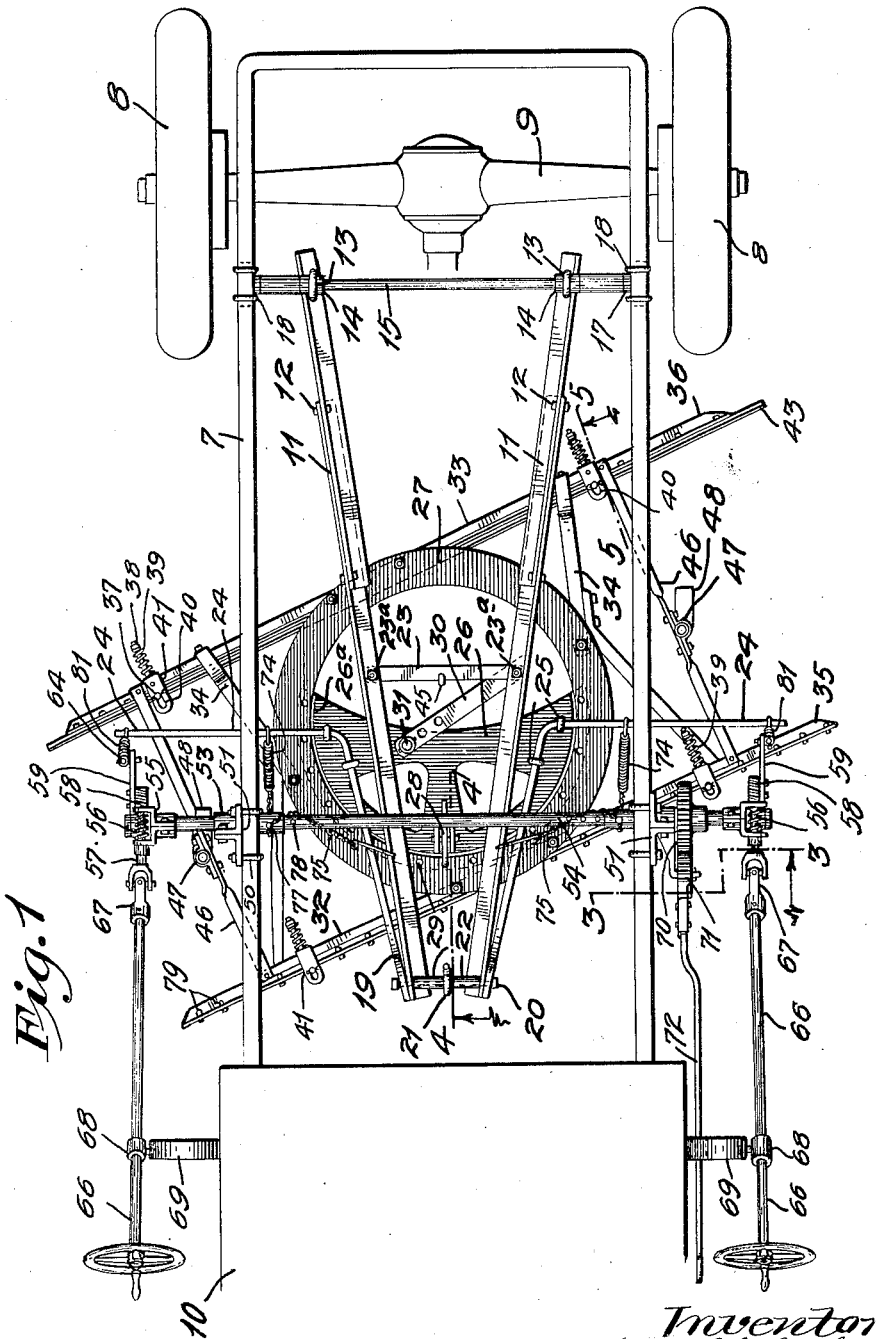

1,497,891

UNITED STATES PATENT OFFICE.

HAROLD W. CLEMONS, OF ST. PAUL, MINNESOTA.

ROAD GRADER.

Application filed April 23, 1923. Serial No. 634,163.

*To all whom it may concern:*

Be it known that I, HAROLD W. CLEMONS, a citizen of the United States, residing at St. Paul, in the county of Ramsey and State of Minnesota, have invented certain new and useful Improvements in Road Graders; and I do hereby declare the following to be a full, clear, and exact description of the invention, such as will enable others skilled in the art to which it appertains to make and use the same.

Broadly stated, my invention provides an improved road grader adapted for use in forming and maintaining dirt road beds, and, generally stated, the invention consists of the novel devices and combinations of devices hereinafter described and defined in the claims.

The road-grading mechanism may be incorporated with any suitable form of carrying truck, but it is of such character that it is especially well adapted for application as an attachment to motor-propelled trucks, such as the well known commercial auto trucks, or to many of the various different forms or types of commercial tractors. When applied to a commercial truck, the grading mechanism will usually be attached to the truck frame with the scrapers arranged to work between the front and rear wheels, but when attached to a tractor, the grading attachment will usually be connected to and supported from a supplemental frame or frame beams projected either forward or rearward of the tractor wheels.

The nature of the invention and the advantages derived therefrom may be best explained by reference to the accompanying drawings, which illustrate my invention in what is at present believed to be its preferred embodiment.

Referring to the drawings, wherein like characters indicate like parts throughout the several views, Fig. 1 is a plan view showing somewhat diagrammatically a commercial auto truck stripped of its body and some parts being omitted, but illustrating my improved grading attachment or mechanism applied thereto;

Fig. 2 is a side elevation of the parts shown in Fig. 1, some parts being omitted, and the rear wheels being diagrammatically indicated by dotted lines;

Fig. 3 is a transverse section taken approximately on the line 3—3 of Fig. 1;

Fig. 4 is a fragmentary vertical section taken approximately on the line 4—4 of Fig. 1;

Fig. 5 is a fragmentary section taken approximately on the line 5—5 of Fig. 1; and Fig. 6 is a detail in section on the line 6—6 of Fig. 2.

Of the parts of the truck, in so far as they are illustrated, the numeral 7 indicates the truck frame, the numeral 8 the rear traction wheels, the numeral 9 the rear axle structure, and the numeral 10 indicates the driver's cab located on the front of the frame 7 and indicated only in diagram.

As a feature of this invention, I employ interchangeably usable front and rear blades or ground-working implements, which may be scraper blades, scarifiers, levelling bars, or the like; and as a connection between the same and the truck frame, I provide push bars, drag bars, a ring bearing, and a blade-swinging or adjusting ring. The push bars are preferably made longitudinally adjustable or variable in length, each bar comprising overlapped angle irons 11 rigidly but adjustably connected by nut-equipped bolts 12. At their rear ends, the push bars 11, by means of nut-equipped U-bolts 13, are rigidly clamped to short bearing sleeves 14 pivotally mounted on a cross rod 15, the ends of which are adapted to be passed through either of several vertically spaced holes 16 formed in anchor brackets 17, which latter, by means of nut-equipped U-bolts 18, are rigidly secured on the under sides of the side bars of the frame 7 and are adapted to be adjusted forwardly and rearwardly thereon.

The dragbars 19, at their front ends, are quite loosely pivoted to the front ends of the push bars 11, by a nut-equipped bolt 20. A depending hook 21 is pivoted on the central portion of the bolt 20, and spacing sleeves 22 are loosely placed on said bolt between the hook and the front ends of the push bars. The front sections of the push bars 11 are preferably cross-connected by a tie-bar 23, so that the push bars are connected to form a sort of an A-frame, which is very strong in its pushing action and will resist lateral thrust, but, nevertheless, will be somewhat flexible in that it will submit sufficient oscillation on the longitudinal axis of the truck so as not to interfere with tilting adjustments of the scraper blade.

The drag bars 19 are pivoted on the ends of the bolt 20, just outward of the push bars 11, and at their rear portions, they are rigidly clamped, preferably by nut-equipped U-bolts 25, to a segmental ring bearing 26. For an important purpose, the drag bars 19 are provided with extensions 24 that project diametrically outward in opposite directions and afford supporting arms for the ring bearing 26, which latter is arranged to be raised and lowered and adjusted through connections that will hereinafter be described and which connections are attached to said arm-forming extensions.

The segmental ring bearing 26, (see particularly Fig. 4), has a depressed shouldered flange 26$^a$ on which is rotatively mounted a large bearing ring 27. The bearing 26 is provided with a spring-pressed lock dog 28 that is adapted to engage any of several circumferentially spaced perforations 29 in the bearing ring 27. To hold the bearing 26 against lateral swaying movements in respect to the push bars 11, it is tied to one of said push bars by a link 30, (see Fig. 1). This link 30, as shown, is loosely pivoted to the push bar by one of the bolts 23$^a$ that connect the tie-bar 23 to said push bar, and the other end of said link is connected to the bearing 26 by a pin 31 on said bearing that is adapted to be inserted into any of several perforations in said link. The connections between the link 30 and the parts to which it is connected are loose enough to permit the necessary movements of the bearing 26 and drag bars 19 in respect to the push bars 11.

To the front portion of the ring 27 is bolted or otherwise rigidly secured the central portion of a long cross beam 32, preferably in the form of a channel beam, and rigidly secured at its central portion to the rear portion of the ring 27, by bolts or otherwise, is a similar beam 33. The beams 32 and 33 are parallel and, to rigidly connect and brace the same, they are connected to the sides of the ring 27 by truss bars 34.

Located in front of the beams 32 and 33, respectively, are supplemental beams 35 and 36, which, at their upper edges, are perforated and loosely hung on elbow bolts 37, the long ends of which are passed rearward through perforations in the respective beams 32 and 33 and provided with nuts 38 between which and the backs of the respective beams 32 and 33 coiled compression springs 39 are placed around said bolts. The upturned ends of the elbow bolts 37 work through slots 40 in the forwardly projecting ends of angle brackets 41 riveted or otherwise rigidly secured to the tops of the cooperating beams 32 and 33. Spacing sleeves 42 are placed on the bolts 37 between the main and supplemental beams, and said sleeves, as shown, have rounded front ends. The numeral 43 indicates a concave scraper blade rigidly but detachably secured by nut-equipped bolts 44 to the supplemental beam 36 and extended below the same with its lower edge arranged to scrape the ground or road bed when lowered. The numeral 45 indicates a hook pivoted to the intermediate portion of the tie-bar 23 and depending therefrom. The numeral 46 indicates tie-bars which connect the front and rear beams 32 and 33, not far from their outer ends. Near their central portions, these tie-bars 46 have bearings 47 in which the vertical stems of caster-acting gage shoes 48 are swiveled. By means of pins insertable through perforations 49 in the stems of the shoes 48, above and below said bearings, these caster-acting gage shoes are made vertically adjustable.

Rigidly secured by nut-equipped hook bolts 50 to the intermediate portions of the sides of the truck frame 7 are short depending posts 51, as shown in the form of angle irons, and to the lower ends of these posts are rigidly secured transversely aligned bearings 53 in which is journaled a transverse windlass shaft 54. Rigidly secured to the outer ends of the windlass shaft 54 are upstanding bearing brackets 55, the upper ends of which are bifurcated to hold between their prongs and against endwise movements short worms 56 secured to stub shafts 57 journaled in said prongs or bifurcated upper ends of said bracket. The worms 56 mesh with worm gears 58 loosely journaled on the ends of the windlass shaft 54 and provided with rearwardly projecting arms 59. Said arms 59 are made circumferentially adjustable on the respective worm gears by nut-equipped bolts 60 that are engageable through different radial rows of circumferential spaced perforations 61 formed in said worm gears 58. The arms 59 are provided with longitudinally spaced perforations 62, through any of which eye-bolts 63 are adapted to be applied. The numeral 64 indicates link-acting bolts passed through the eye-bolts 63, provided with threaded stop nuts 65 above the same and, at their lower ends, having heads pivotally connected to the outer ends of the arms 24, which latter, it will be remembered, project from the ring bearing 26 and, as shown, are formed integral with the respective drag bars 19.

For independently operating the worms 61, I have shown operating rods 66 connected by knuckle joints 67 to the front ends of the worm shafts 57, and arranged to rotate in and slide through bearing sleeves 68 that are swiveled to the outwardly and downwardly turned ends of brackets 69 rigidly secured to the sides of the truck frame 7.

Just outward of one of the bearings 53, as shown at the left-hand side, the windlass shaft 54 has a rigidly secured spur gear 70 that meshes with another spur gear 71 journaled to a projection of the adjacent bearing 53 and secured to one end of a lever 72. The free end of the lever 72 works adjacent to the left-hand bracket 69 and is adapted to be sprung laterally into and out of engagement with either of several vertically spaced hook lugs 73 formed on said adjacent bracket. To carry a greater part of the weight of the ring 27 and the scrapers or road-working devices carried thereby, I have provided a pair of heavy coiled springs 74, the lower ends of which, as shown, are attached to the arms 24 and the upper ends of which, in the arrangement illustrated, are attached to the windlass shaft 54.

Downward movements of the push bars 11 are limited by upwardly diverging chains or cables 75, the lower ends of which are attached to said push bars and the upper ends of which are anchored to and adapted to be wound upon said windlass. These chains not only sustain the weight of the front ends of the push bars 11, but brace the same against lateral swaying movement.

In the arrangement illustrated, the upper ends of the chains 75 are directly secured to collars 76 that are adjustably securable on the windlass shaft 54 by bolts 77 insertable through any of several perforations 78 formed in said shaft. Adjustment of the collars 76 adapts the windlass shaft to be properly journaled to truck frames that vary considerably in width.

In the machine illustrated, the front or forward road-grading tool or device is of the character known as the scarifying device, and this feature is accomplished by providing the supplemental beam 35 with depending scarifying pins 79. To make these pins 79 readily replaceable, they are passed through perforations in the lower flange of the beam 35 and have laterally bent ends passed through perforations in the upper portions of the beam 35 and provided with removable anchoring pins 80, (see particularly Fig. 4).

The numeral 81 indicates coiled springs placed on the link-acting rods 64 and compressed between the lower ends thereof and the cooperating eye-bolts 63.

To adapt the attachment to trucks having frames located different distances above the ground, the windlass shaft 54 is made vertically adjustable by providing means for vertically adjusting the bearings 53 on the posts 51; and, as shown, this is accomplished by providing said posts with vertically spaced bolt holes 82 through which nut-equipped bolts 83 may be passed, as best shown in Fig. 3. The hook bolts 50 permit the posts 51 to be adjusted longitudinally on the frame.

*Operation.*

In grading or maintaining roads, the scraper blades or similar road-engaging working tools will be set obliquely with the line of travel. In the drawings, they are shown as set to work the earth toward the left-hand side of the truck or machine, but, as heretofore described, they may be set obliquely in the opposite direction and at any desired angle to the line of travel, simply by adjustments of the lock dog 28 into one or the other of the holes 29 in the ring 27, which ring, of course, rotates in the setting of the blades or tools.

When the lever 72 is interlocked with one or the other of the lugs 73 on the cooperating bracket 69, the windlass shaft 54 will be held against rotation, and thus the brackets 55 that support the worms 56 are then held stationary so that they then afford stationary bases of reaction, preventing axial movements of the worms 56. Hence, by rotation of the adjusting rods 66, the arms 59 may be oscillated upwardly to raise and downwardly to depress the ring 27 and the scraper blades or tools carried thereby; and, inasmuch as the said rods 62 may be independently rotated, the scraper blades or similar devices may be set to work on a level or inclined in either direction in respect to horizontal planes, as required in rounding up or beveling the sides of road beds. Moreover, when the arms 59 are forced downward so as to compress the springs 81, the lower ends of the scarifying pins 79 and the lower edge of the scraper blade 43 will be pressed into the ground, but the downward movement thereof into the ground will be limited by the gage shoes 48. The swiveling of these gage shoes adapts them to more readily follow the line of travel of the machine.

Raising and lowering of the scraper blade and scarifying device will usually be accomplished by manipulation of the adjusting rods 66. However, it is frequently desirable to temporarily and quickly first raise and subsequently lower said blades and scarifying device to cause them to clear some obstruction, such as a rock, for example. This may be done by a quick manipulation of the lever 72. Upward movement of the lever 72 will raise and downward movement thereof will lower said scraper blade and scarifying device.

When the downward movements of the front ends of the push bars 11 are limited by the chains 75 and the guide bars 19 are then lowered by movement on the then relatively fixed bolt 20, the scraper blade will be lowered faster than the scarifying device, and this is desirable when the action requires the scraper blade to cut deeper than the scarifying pins. Nevertheless, the scraper blade and scarifying pins may, when desired, be set to work at the same elevation or on the same level. To accomplish this, it is only necessary to properly raise or lower the free front ends of the push bars 11 and this may be accomplished either by hooking the chains 75 to longer or shorter lengths or by shifting the engagement of the levers 72 from one to the other of the lugs 73.

If the pressure on the lower edge of the scraper blade 43 or on the lower ends of the scarifying pins 79 should be so excessive as to endanger breaking, then the springs 39, (see Figs. 4 and 5), will yield, thereby permitting the supplemental beams 35 and 36 to oscillate on the lower flanges of the main beams 32 and 33; and this will cause the upturned ends of the bolts 37 to move forward in the slots 40 and the lower extremities of said blade and pins to oscillate rearward and thereby release themselves to a greater or less extent sufficient to prevent breakage.

When the machine is backed up, the scraper blade and scarifying pins are free for forward swinging movements, so that they will clear themselves of or pass over accumulated dirt or the like.

When the machine is to be moved from place to place, the scraper blade and the scarifying device may be swung forward and upward into approximately horizontal inoperative position and there held by the engagement of the hook 21 with the lower flange of the supplemental beam 35 and by the engagement of the hook 45 with the edge of the scraper blade 43, as shown by dotted lines in Figs. 4 and 5. Here it will be noted that the perforations in the upper edges of the supplemental beams 35 and 36 adapt them to be freely turned from engagement with the horizontal into engagement with the vertical portions of the elbow bolts 37. It may be further noted that if dirt should accumulate and press hard against the upper portions of the supplemental beams 35 and 36, or in engagement with the scraper blade 43 above the lower fulcrum-acting flange of the beam 33, the spacing sleeves 42 will act as stops to prevent said supplemental beams from yielding or moving rearward in respect to the cooperating main beams 32 and 33.

The various different adjustments in the connections for attaching the excavating mechanism to the truck frame make it an easy matter properly to connect the grader attachment to truck frames or tractor frames having a wide range and variation in their different dimensions.

The cooperative arrangement of the push bars and drag bars and their connections to the scraper blades or ground-working tools is herein considered as broadly new. The use thereof gives a flexibility and facility for adjustments not found where the ordinary drag bars alone are employed. Also, it is important to note that not only are the ring 27 and drag bars 19 capable of freely rising under upward pressure, but also the push bars 11 may be freely lifted whenever the pressure, due to exclusively hard road beds or the like, tends to move the scraper blade upward. The connections described give the proper means for limiting the downward movements of the scraper blade and scarifying pins or the like into the ground, but do not positively hold the same downward, and permit the same to be forced upward instead of subjecting the same always to the excessive strains that would be applied if they were not free to rise. Of course, gravity and the yielding pressure applied thereto are sufficient to hold them to their work under normal operative conditions.

What I claim is:

1. The combination with a supporting frame, of push bars pivotally connected thereto at their rear ends, drag bars pivotally connected at their front ends to the front ends of said push bars, and a ground-working tool connected to the rear ends of said drag bars.

2. The combination with a supporting frame, of push bars pivotally connected thereto at their rear ends, drag bars pivotally connected at their front ends to the front ends of said push bars, a ground-working tool connected to the rear ends of said drag bars, and means for limiting the downward movements of said push bars and drag bars.

3. The combination with a supporting frame, of push bars pivotally connected thereto at their rear ends, drag bars pivotally connected at their front ends to the front ends of said push bars, a ground-working tool connected to the rear ends of said drag bars, and means for limiting the downward movements of said push bars and drag bars, said bars and ground-working tool being free to rise under excessive upward pressure.

4. The combination with a supporting frame, of push bars pivotally connected thereto at their rear ends, drag bars pivotally connected at their front ends to the front ends of said push bars, a ground-working tool connected to the rear ends of said drag bars, and independently adjustable devices for limiting the downward movements of said push bars and drag bars.

5. The combination with a supporting frame, of push bars pivotally connected thereto at their rear ends, drag bars pivotally connected at their front ends to the front ends of said push bars, a ground-working tool connected to the rear ends of said drag bars, and independently adjustable devices for limiting the downward movements of said push bars and drag bars, and which limiting devices will yield under upward pressure.

6. The combination with a supporting frame, of push bars pivotally connected thereto at their rear ends, drag bars pivotally connected at their front ends to the front ends of said push bars, a ring bearing secured to said drag bars, a ring pivoted on said bearing, a scraper blade connected to said ring for horizontal rotary adjustments therewith, and means for securing said ring and scraper blade in different angular adjustments.

7. The structure defined in claim 6 in which said ring bearing has outstanding arms, and in further combination with means mounted on said frame and connected to said arms for vertically adjusting the same.

8. The structure defined in claim 6 in which said ring bearing has outstanding arms, and in further combination with means mounted on said frame and connected to said arms for vertically adjusting the same, and means mounted on said frame for vertically adjusting the front ends of said push bars independently of vertical adjustments of said bearing blade ring and scraper blade.

9. The structure defined in claim 6 in which said ring bearing has outstanding arms, and in further combination with means mounted on said frame and connected to said arms for vertically adjusting the same, and in further combination with means mounted on said frame for independently vertically adjusting said arms to thereby vertically adjust said scraper blade and to set the same at different inclinations.

10. The combination with a supporting frame, of push bars pivotally connected thereto at their rear ends, drag bars pivotally connected at their front ends to the front ends of said push bars, and a ground-working tool connected to the rear ends of said drag bars, the said push bars being longitudinally extensible.

11. The structure defined in claim 6 in further combination with a transverse thrust bar connecting said ring bearing to one of said push bars to resist lateral thrust but permitting relative vertical movements of the members connected thereby.

12. The structure defined in claim 1 in which there is a second ground-working tool extended parallel to the first noted ground-working tool.

13. The structure defined in claim 1 in which there is a second ground-working tool extended parallel to the first noted ground-working tool, the said two connected ground-working tools being arranged for simultaneous horizontal angular adjustments so as to work the earth toward either side of the machine.

14. The combination with a supporting frame, of push bars pivotally connected thereto at their rear ends, drag bars pivotally connected at their front ends to the front ends of said push bars, a ground-working tool connected to the rear ends of said drag bars, the said ground-working tool being mounted for forward swinging movements, and means for securing the same in an inoperative position when swung forward and upward.

15. The combination with a supporting frame, of push bars pivotally connected thereto at their rear ends, drag bars pivotally connected at their front ends to the front ends of said push bars, a ground-working tool, a pivotal connection between said ground-working tool and drag bars, and a gage shoe limiting the downward movement of said ground-working tool.

16. The structure defined in claim 15 in which there are two of said gage shoes located one on each side of the machine and mounted for independent vertical adjustments in respect to said ground-working tool.

17. In a grader, a ground-working tool comprising a fixed main beam, a supplemental beam pivotally connected to said main beam at its upper portion and engageable with the lower portion thereof to limit the rearward movement of said supplemental beam, and ground-working means secured to and depending from said supplemental beam.

18. In a grader, the combination with a fixed main beam, of rearwardly spring-pressed elbow bolts passed through the upper portions of said main beams with their upturned ends in front thereof, guides for the upper ends of said elbow bolts permitting longitudinal forward movements thereof, a supplemental beam pivotally hung on the front end portions of said elbow bolts and capable of forward swinging movements thereon, means limiting the rearward movement of the upward portion of said supplemental beam, and ground-working means secured and depending from said supplemental beam.

19. The structure defined in claim 18 in further combination with a depending hook, the lower end of which is engageable with said supplemental beam to hold the same in a forwardly upturned inoperative position.

20. The structure defined in claim 1 in further combination with a counterbalancing spring anchored on said supporting frame and sustaining part of the weight of the load carried by said drag bars.

21. The structure defined in claim 6 in further combination with a coiled counterbalancing spring anchored on said supporting frame and connected to said ring bearing and sustaining part of the weight of the load carried thereby.

22. The structure defined in claim 1 in further combination with a windlass shaft carried by said supporting frame, reversely oblique flexible connections between said windlass shaft and the front portions of said push bars, means for oscillating said windlass shaft and for locking the same against rotation, worm gears rotatively mounted on the ends of said windlass shaft and provided with radially projecting arms, connections between said arms and drag bars for vertically adjusting the same and the ground-working tool carried thereby, brackets secured to the ends of said windlass shaft adjacent said worm gears, worms journaled in said brackets and meshing with said worm gears, and operating connections for independently rotating said worms.

23. The structure defined in claim 1 in further combination with a windlass shaft carried by said supporting frame, reversely oblique flexible connections between said windlass shaft and the front portions of said push bars, means for oscillating said windlass shaft and for locking the same against rotation, worm gears rotatively mounted on the ends of said windlass shaft and provided with radially projecting arms, connections between said arms and drag bars for vertically adjusting the same and the ground-working tool carried thereby, brackets secured to the ends of said windlass shaft adjacent said worm gears, worms journaled in said brackets and meshing with said worm gears, operating connections for independently rotating said worms, and means for vertically adjusting said windlass shaft in respect to said supporting frame.

24. The structure defined in claim 1 in further combination with a windlass shaft carried by said supporting frame, reversely oblique flexible connections between said windlass shaft and the front portions of said push bars, means for oscillating said windlass shaft and for locking the same against rotation, worm gears rotatively mounted on the ends of said windlass shaft and provided with radially projecting arms, connections between said arms and drag bars for vertically adjusting the same and the ground-working tool carried thereby, brackets secured to the ends of said windlass shaft adjacent said worm gears, worms journaled in said brackets and meshing with said worm gears, and operating connections for independently rotating said worms, the connection between said arms and drag bars being unyielding under upward tension but yielding under downward compression.

In testimony whereof I affix my signature.

HAROLD W. CLEMONS.